(12) United States Patent
Oozeki et al.

(10) Patent No.: US 8,524,345 B2
(45) Date of Patent: Sep. 3, 2013

(54) PIPE MODULE

(75) Inventors: Yoshio Oozeki, Yokohama (JP); Satoshi Arai, Yokohama (JP); Shigeharu Tsunoda, Fujisawa (JP); Taihei Yotsuya, Tokyo (JP); Shizuo Imaoka, Fujimino (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 79 days.

(21) Appl. No.: 13/179,725

(22) Filed: Jul. 11, 2011

(65) Prior Publication Data

US 2012/0040122 A1 Feb. 16, 2012

(30) Foreign Application Priority Data

Aug. 12, 2010 (JP) ................................ 2010-180899

(51) Int. Cl.
*B32B 1/08* (2006.01)
*B32B 15/082* (2006.01)
*B32B 15/092* (2006.01)

(52) U.S. Cl.
USPC ....... 428/36.9; 428/34.4; 428/35.8; 428/35.9; 428/36.4; 428/36.8; 428/36.91; 428/36.92

(58) Field of Classification Search
USPC ................... 428/34.1, 34.4–34.7, 35.7–35.9, 428/36.4, 36.6–36.92
See application file for complete search history.

(56) References Cited

U.S. PATENT DOCUMENTS
5,470,622 A * 11/1995 Rinde et al. .................. 428/34.9

FOREIGN PATENT DOCUMENTS
JP 2007-067989 3/2007

* cited by examiner

*Primary Examiner* — Walter B Aughenbaugh
(74) *Attorney, Agent, or Firm* — Antonelli, Terry, Stout & Kraus, LLP.

(57) ABSTRACT

A temporary part is fixed to a base by using an adhesive layer to which fillers are mixed at a predetermined density. When the temporary part is heated, heat is applied to the fillers and the adhesive layer. At a temperature equal to or higher than the glass-transition temperature of the adhesive agent, the heated adhesive layer is thermally contracted so as to release remaining stress, and on the other hand, the heated fillers are thermally expanded. In this manner, the peel-off strength between the adhesive layer and the base (or the temporary part) is reduced, and the disassembly is facilitated.

6 Claims, 7 Drawing Sheets

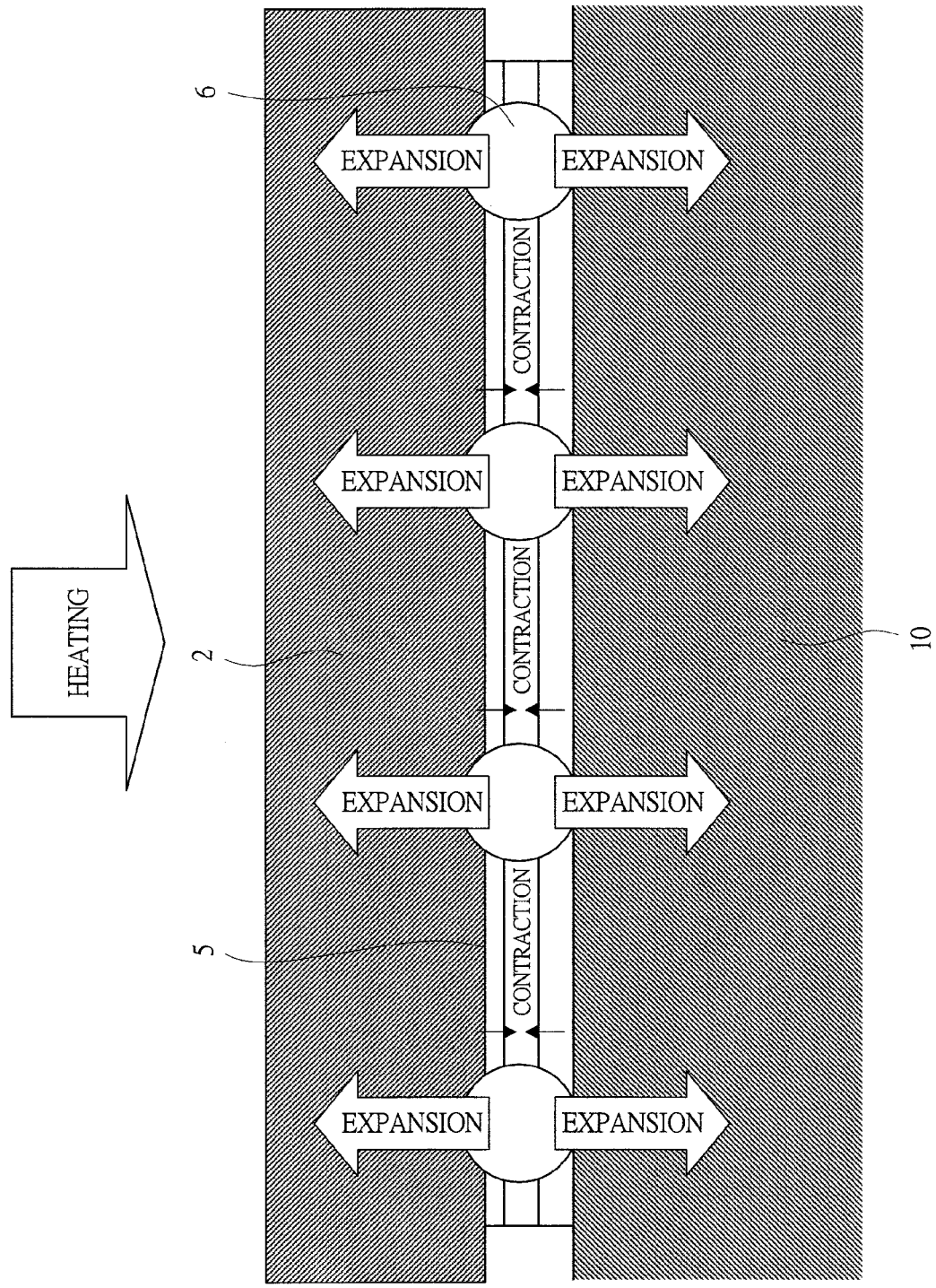

PIPE MODULE

CROSS-REFERENCE TO RELATED APPLICATION

The present application claims priority from Japanese Patent Application No. 2010-180899 filed on Aug. 12, 2010, the content of which is hereby incorporated by reference into this application.

TECHNICAL FIELD OF THE INVENTION

The present invention relates to a construction method of a pipe module for efficiently building a power plant such as a nuclear power plant, a thermal power plant, a hydraulic power plant or the like, and particularly relates to a method of removing a transporting member attached to the pipe module.

BACKGROUND OF THE INVENTION

In the construction of various power plants such as a nuclear power plant, a thermal power plant, a hydraulic power plant and the like, for the efficient construction of the power plant, pipes modularized in advance are transported to the plant construction site, and the modules are aligned with each other to mutually connect the pipes on the site.

In order to efficiently carry out assembly on the site, the pipe modules have to be fixed at the positions determined for each of the pipes. Therefore, a temporary member is newly attached to the base of each pipe module to support the positioning of the pipes.

Herein, the method of attaching the temporary members for positioning the pipes is welding. Therefore, there is a problem that a lot of time is required for the welding as the number of temporary members is increased. Similarly, the welded parts have to be mechanically scraped off when the temporary members are detached on the construction site, and there is a problem that a lot of working time is required also for the disassembling operations.

Therefore, a construction method capable of replacing the welding operation by a simple method without taking a lot of time for the attaching operation and disassembling operation of the temporary members in the pipe module construction is demanded.

In Japanese Unexamined Patent Application Publication No. 2007-67989 (Patent Document 1), constituent members for a speaker device are bonded to each other by an adhesive element containing microcapsules having thermal expansivity in an adhesive agent, and each of the microcapsules has liquid hydrocarbon having a low boiling point and a shell made of PVC (polyvinyl chloride) or the like enclosing the liquid hydrocarbon. By this means, at the time of recycling the speaker device, by applying the heat treatment to the adhesive element and others, the internal pressure thereof increases and the shell is softened and starts swelling, the volume of the microcapsules is increased along with further temperature increase, and the microcapsules are finally ruptured. As a result, since gaps are formed between the constituent members and the constituent members can be easily disassembled, the speaker device excellent in recyclability can be provided.

SUMMARY OF THE INVENTION

However, the temporary members for positioning the pipes have been conventionally attached by welding operations. Therefore, if the number of pipe modules to be used is increased, the temporary members are correspondingly increased, and there has been a problem that a lot of time and man-hours are required.

Similarly, when the temporary members are detached on the construction site of the power plant, the welded parts have to be mechanically scraped off. If the number of pipe modules to be used is increased, there is a problem that a lot of working time is required also for the disassembling operation.

An object of the present invention is to provide a construction method of a pipe module capable of easily disassembling an adhered and fixed temporary member without deteriorating safety even in a pipe module assembling factory and on the site of plant construction where the arc welding operation is carried out for the attaching operation of the temporary members to the pipe module and the disassembling operation thereof.

The above and other objects and novel characteristics of the present invention will be apparent from the description of the present specification and the accompanying drawings.

The following is a brief description of an outline of the typical invention disclosed in the present application.

A pipe module according to a typical embodiment of the present invention comprises: a pipe; a temporary part for fixing the pipe at a correct position; and a base to which the pipe and the temporary part are fixed, and the temporary part and the base are adhered to each other by an adhesive layer formed of an adhesive agent to which a filler is added at a predetermined ratio.

In this pipe module, by application of heat, the filler is thermally expanded, and the adhesive layer is thermally contracted.

In this pipe module, space is generated between the adhesive layer and the temporary part or between the adhesive layer and the base by the application of heat.

In these pipe modules, the adhesive agent is a two-component cold-setting epoxy adhesive agent or a two-component cold-setting acrylic adhesive agent.

In these pipe modules, an elastic modulus of the adhesive agent at 25° C. is 0.1 GPa or higher.

In these pipe modules, the filler has a diameter of 150 μm or more.

In these pipe modules, the application of heat causes glass transition of the adhesive agent.

By using the pipe module of the present invention, the adhered and fixed temporary member can be safely and easily disassembled even on the site of the pipe module where the arc welding operation is carried out for the attaching operation of the pipe module and the disassembling operation of the temporary members thereof.

Moreover, by using the pipe module of the present invention, compared with the case where the temporary member is fixed by welding and disassembled, the time for the welding operation and disassembling operation can be significantly reduced, which contributes to shortening of the construction work period.

BRIEF DESCRIPTIONS OF THE DRAWINGS

FIG. 5 is a schematic drawing showing the behavior when an adhesive layer and the fillers are heated in the present invention;

Figure 7:
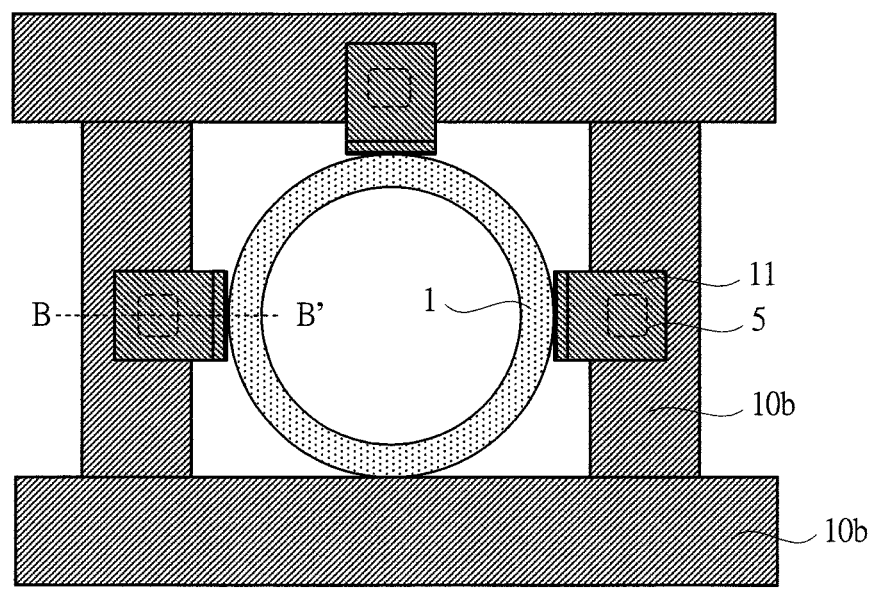
Figure 8:
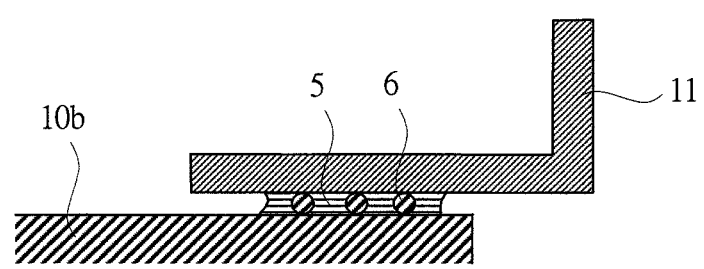

FIG. 7 is a diagram of an example showing the entirety of the case where temporary parts are provided at three locations of upper, right and left locations of a pipe-fixing support frame to which the second embodiment of the present invention is applied; and FIG. 8 is a diagram of an example showing an adhesive part of the case where the temporary part is adhered and fixed to the pipe-fixing support frame to which the second embodiment of the present invention is applied in an enlarged manner.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Hereinafter, an embodiment of the present invention will be described with reference to drawings.

(First Embodiment)

Figure 1:
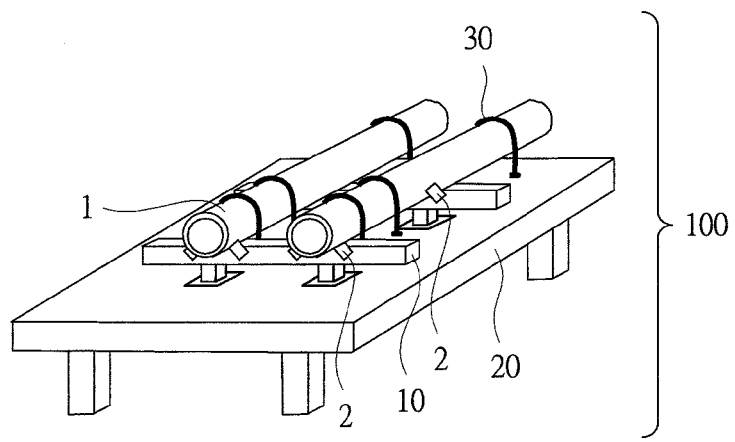
FIG. 1 is a schematic perspective view of a pipe module to which a first embodiment of the present invention is applied.

FIG. 1 is a schematic perspective view of a pipe module 100 to which a first embodiment of the present invention is applied. Note that the number of the members shown in the drawings is increased or decreased depending on the case and is not limited to those in the drawings.

As shown in FIG. 1, the pipe module 100 of the present embodiment has pipes 1, temporary parts 2, bases 10, a transporting base 20 and metal wires 30.

The pipe 1 is a pipe used for circulation of cooling water or the like for efficiently operating a power plant.

The temporary part 2 is a member for suppressing only the lateral misalignment in the positioning of the pipe 1.

The base 10 is a structural member for fixing the pipe 1.

Figure 2:
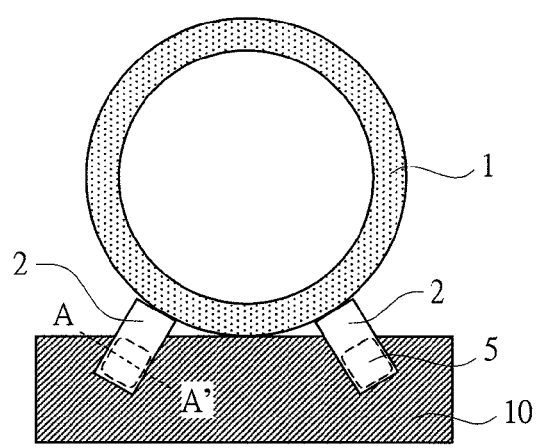
FIG. 2 is a side view of the pipe module of the first embodiment of the present invention.

An adhesive layer 5 shown in FIG. 2 is a layer of an adhesive agent which fixes the temporary part 2 and the pipe-fixing base 10.

The base 20 is a structural member for transporting the pipe module 100.

The metal wire 30 is a fixing metal wire which fixes the pipe 1 to the base 20.

The pipe module 100 has a structure in which each of the pipes 1 is aligned and fixed in advance by using temporary members in a module assembly factory. By virtue of the modularization, efficiency can be increased on the site of power plant construction from the alignment for each pipe 1 to the alignment for each module.

In addition, compared with the case where temporary parts are fixed by welding and disassembled, the time taken for welding operations and disassembling operations can be significantly shortened, and it is possible to contribute to further shortening of the construction work period.

As a result, the construction method using the pipe module 100 is an important construction method capable of shortening the construction period of power plants.

Generally, the material of the pipe 1 used in a power plant, the pipe-fixing base 10, the transporting base 20 and the temporary part 2 for suppressing only the lateral misalignment is carbon steel. Anticorrosion treatment is carried out to the surfaces of these members. Also, the adhesive material which fixes the temporary part 2 is made of a two-component cold-setting epoxy adhesive agent or a two-component cold-setting acrylic adhesive agent. Objects of the present invention include these constitutions as a matter of course, but the present invention can be applied also to the cases using other metals.

The present embodiment is an example in which the temporary parts 2 are provided only on both sides of the pipe 1.

Figure 3:
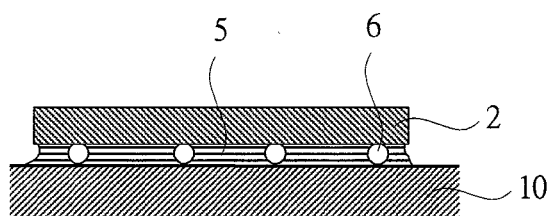
FIG. 3 is a cross sectional view of an adhesion part corresponding to the A-A' cross section of FIG. 2.

FIG. 2 is a side view of the pipe module 100 of the first embodiment of the present invention. FIG. 3 is a cross sectional view of an adhesion part corresponding to the A-A' cross section of FIG. 2.

These drawings show the example in which the temporary parts 2 are adhered and fixed to the both sides of the pipe 1 on the pipe-fixing base 10.

The pipe module 100 is composed so that the temporary parts 2 supporting the pipe 1 can suppress the lateral misalignment of the pipe 1 when the pipe module 100 is transported from a module assembly factory to a construction site of a power plant or the like. The temporary parts 2 are fixed by the adhesive material to predetermined positions of the pipe-fixing base 10.

Herein, the reason why stress is generated by impact-like external load generated at the temporary part 2 of the pipe module 100 will be described.

The pipe module 100 assembled in the module assembly factory is transported to the site of plant construction by transportation means such as a ship or a vehicle.

The pipe 1 itself including the metal wire 30 and others is fixed to the transporting base 20. However, due to the influence of waves in the case of the transportation by a ship or the influence of the road surface in the case of the transportation by a vehicle, movement of the gravity center position of the pipe 1 itself and a rapid change in the direction in which the force acts are also conceivable. As a result, impact-like load mainly in the vertical and lateral directions is generated at the temporary part 2 which supports the pipe 1. Therefore, during the transportation, impact-like load in the shear direction is applied to the adhesive layer 5 which fixes the temporary part 2.

Therefore, the adhesive layer 5 which fixes the temporary part 2 requires "high-strength adhesion" capable of enduring the impact-like load in the shear direction and replacing welding.

The shear strength of the adhesive layer 5 is increased along with increase in the adhesion area. Therefore, "high-strength adhesion" can be realized by adjusting the adhesion area.

Next, detachment after the pipe module 100 is installed on a plant will be considered.

On the site of plant construction after the pipe module 100 is transported, it is necessary to easily detach the temporary part 2.

If the adhesion area is increased in order to realize the high-strength adhesion capable of replacing welding, the strength at the disassembly is also increased at the same time. Therefore, if the adhesion area is simply increased, disassembly cannot be easily carried out. Accordingly, the adhesion fixing technique for reducing the ratio of the disassembly strength to the adhesion strength as much as possible is required so as to suppress the increase in the strength at the disassembly even when high-strength adhesion is realized by increasing the adhesion area.

In the present embodiment, the temporary part 2 forms the adhesive layer 5 by using the cold-setting adhesive agent and is fixed to the base 10. To the adhesive layer 5, solid fillers 6 are added at a room temperature.

FIG. 3 shows the adhesive layer 5 and the fillers 6. More specifically, the adhesive layer 5 is formed of one or two or more adhesive agent layers, and the fillers 6 are contained in the adhesive layer 5 in the formation process thereof. However, the process is not limited to this as long as the fillers 6 are mixed before hardening in the adhesive agent used in the adhesive layer 5, and the fillers may be added by, for example, a method in which the fillers are mixed in advance when the adhesive agent is blended or a method in which the fillers are separately sprayed thereto within the usable time in the hardening of the adhesive agent.

At the time of disassembly, heat is applied so as to reach the glass-transition temperature Tg (hereinafter, abbreviated as Tg) of the adhesive material which forms the adhesive layer 5 or higher, and a load in the peel-off direction is applied to the adhesion surface, thereby easily disassembling the temporary part 2.

Figure 4A:
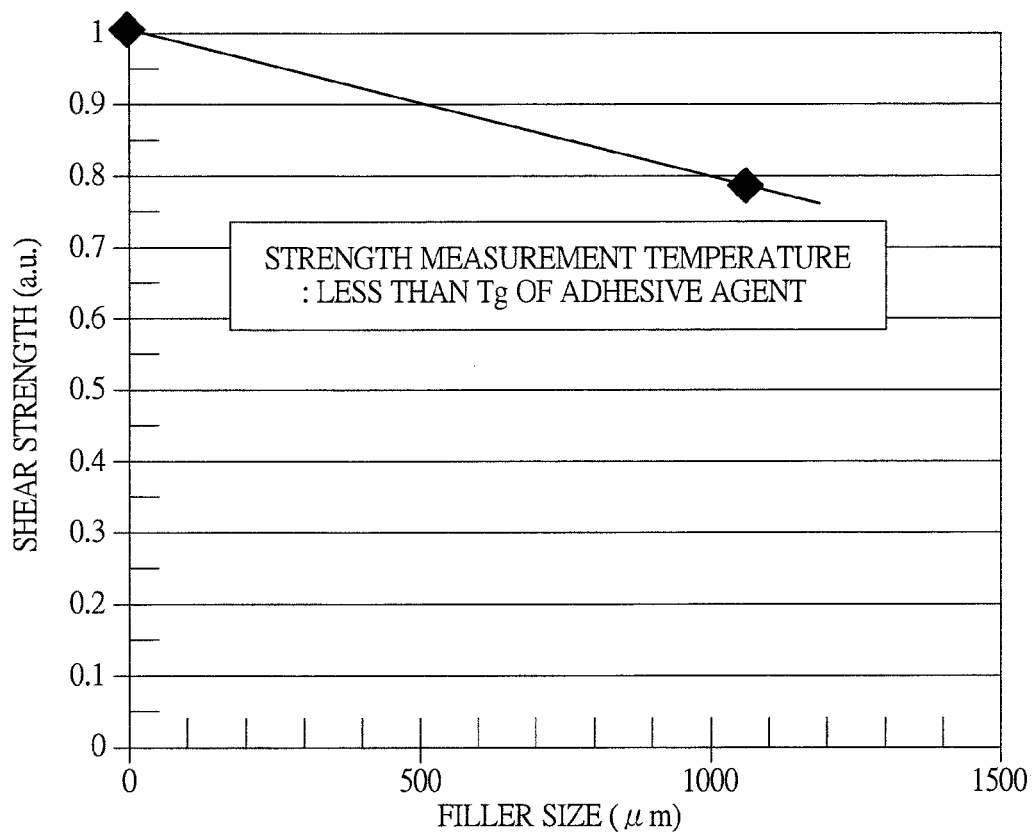
FIG. 4A is a graph showing the relation between the size of fillers and shear strength.
Figure 4B:
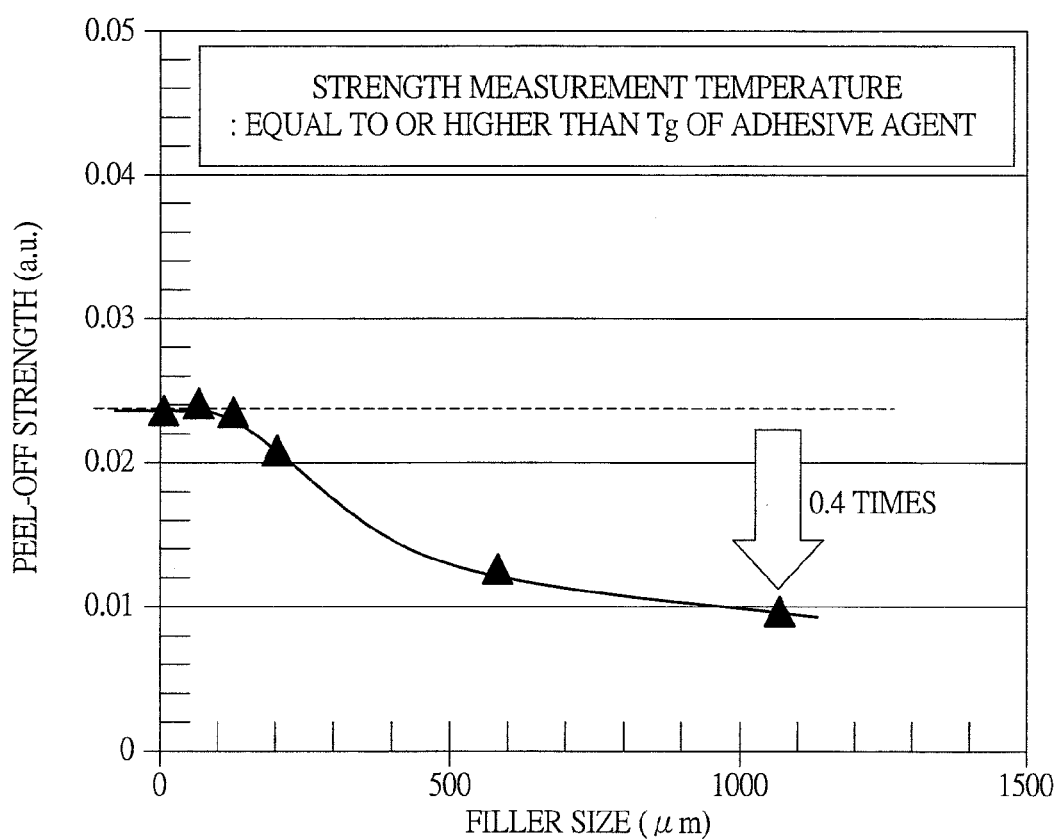
FIG. 4B is a graph showing the relation between the size of fillers and peel-off strength when a measurement temperature is Tg or higher.
Figure 4C:
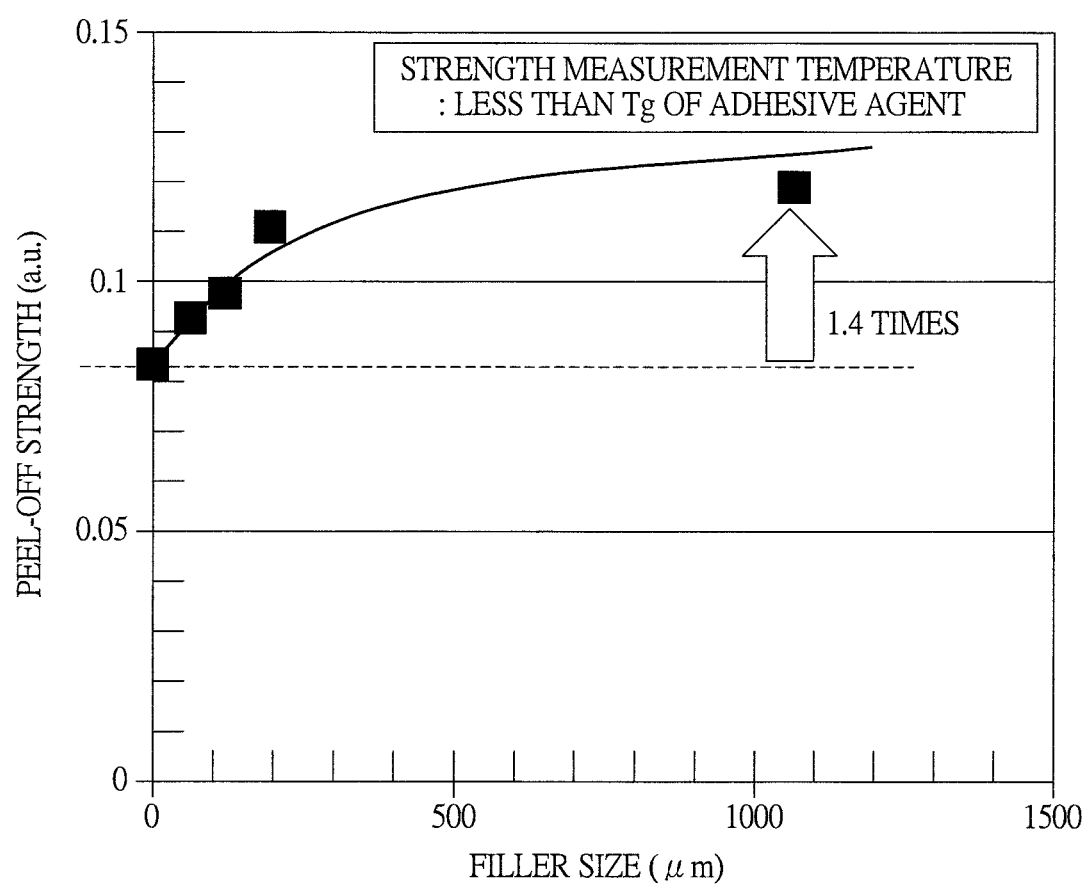
FIG. 4C is a graph showing the relation between the size of fillers and peel-off strength when a measurement temperature is less than Tg.

FIGS. 4A, 4B and 4C are graphs showing the results of adhesion strength in the case where metal fillers 6 are added to the adhesive layer 5 formed of the two-component cold-setting adhesive agent. FIG. 5 is a schematic drawing showing the behavior of the adhesive layer 5 and the fillers 6 after heating in the present invention.

FIG. 4A shows the relation between the filler size and the shear strength. FIG. 4B shows the relation between the filler size and the peel-off strength when the measurement temperature is Tg or higher. FIG. 4C shows the relation between the filler size and the peel-off strength when the measurement temperature is less than Tg.

These graphs show the normalized results based on the shear strength at a temperature less than Tg of the adhesive agent without filler addition (the case where the filler size is zero) taken as a reference strength.

The filler size shown in FIGS. 4A, 4B and 4C is the value of the height of the filler 6 after the adhesion of FIG. 3. For example, in the case of a spherical filler, if the filler is deformed due to the load applied in the adhesion process, the filler size is the height after the deformation, and in the case of a pulverized filler, the filler size is not the maximum length of the pulverized filler, but the size of the pulverized filler actually corresponding to the adhesion height thereof.

When looking at these graphs, as shown in FIG. 4A, the shear strength in the case where the adhesive agent used in the adhesive layer 5 is less than Tg corresponds to 0.8 when the filler size is about 1050 μm, and it has a tendency that the strength is somewhat reduced along with the increase in the filler size. With respect to this, the high-strength adhesion can be realized by increasing the adhesion area.

As shown in FIG. 4B, the peel-off strength in the case where the adhesive agent used in the adhesive layer 5 is Tg or higher corresponds to 0.01 when the filler size is about 1050 μm. The adhesion strength can be significantly reduced by applying heat so as to reach the glass-transition temperature of the adhesive agent used in the adhesive layer 5 or higher, applying the load in the peel-off direction to the adhesion fixing part, and increasing the filler size. The tendency of strength reduction capable of suppressing the increase in the strength at the time of disassembly (heating) is observed from the filler size of about 150 μm. The ratio of the disassembly strength to the adhesion strength is 2.5/100 when there is no filler addition.

On the other hand, when the filler size is, for example, about 1050 μm, the effect of further reduction by half or more to about 1/100 is confirmed. It is estimated that the stress remains in the adhesive agent used in the adhesive layer 5 at the time of hardening at a room temperature, and by applying heat so as to reach the glass-transition temperature of the adhesive agent used in the adhesive layer 5 or higher, a contraction force to release the remaining stress acts more than the thermal expansion of the adhesive layer 5 caused by the heat. Meanwhile, the solid fillers 6 added to the adhesive agent used in the adhesive layer 5 suppress the movement of the adhesive layer 5 to be contracted, and the fillers 6 expand due to the heat. It is considered that the peel-off strength of the adhesive layer 5 is significantly reduced in the above-described manner.

In view of these, as the adhesive agent used in the adhesive layer 5, an adhesive agent having a comparatively high glass-transition temperature and a high elastic modulus compared with an elastic adhesive agent is desirable so that high positional precision and high shear strength can be realized even in the temperature environment at the time of transportation in particular. More specifically, it is preferred to use an acrylic or epoxy two-component cold-setting adhesive agent having an elastic modulus at 25° C. of about 0.1 GPa or higher and a linear contraction percentage of about 0.5 to 2% as a remaining contraction percentage of the adhesive agent.

According to the above-described results, the practical lower limit of the size of the filler 6 is about 150μ at which the tendency of strength reduction is observed. On the other hand, it is considered that the practical upper limit of the size of the filler 6 is desirably about 3 mm when the usable time of the adhesive agent used in the formation of the adhesive layer 5, the suppression of the dripping property after adhesive agent application and others are taken into account.

Moreover, in order to suppress the contraction force of the adhesive agent used in the adhesive layer 5, the elastic modulus of the filler 6 at 25° C. is desired to be higher than that of the adhesive agent used in the adhesive layer 5 by one or more orders of magnitude. Specific examples thereof include: ceramics such as alumina, zirconia, mullite, silicon nitride and silicon carbide; glasses such as soda glass, borosilicate glass and silicon oxide (silica); and silicon (Si). Also, metals containing copper (Cu), zinc (Zn), aluminum (Al) and others as main components and having larger linear expansion coefficients compared with the ceramics and glasses are more desirable. Furthermore, in the case of a metal such as solder which has an elastic modulus higher than that of the adhesive agent used in the adhesive layer 5 by one or more orders of magnitude, has a larger linear expansion coefficient compared with ceramics and glasses and exhibits phase change from solid to liquid at high temperature, strength increase at the disassembly can be further suppressed by the volume change from solid to liquid.

Moreover, as shown in FIG. 4C, the peel-off strength in the case where the adhesive agent used in the adhesive layer 5 is less than Tg is improved along with the increase in the size of the filler 6. Therefore, even if the pipe 1 is moved in the front/back direction of FIG. 2 in the transportation of the pipe module 100, safety during the transportation can be improved.

As described above, when the pipe module 100 is composed in the above-described manner, the high-strength adhesion of the temporary part 2 required for the transportation of the pipe module 100 and the simple operation at the disassembly can be both achieved. Therefore, in the construction method of the pipe module 100, the welding operation can be replaced by a simple method without consuming a lot of time for the attaching operation and the disassembling operation of the temporary part 2.

(Second Embodiment)

Next, a second embodiment of the present invention will be described with reference to drawings.

Figure 6:
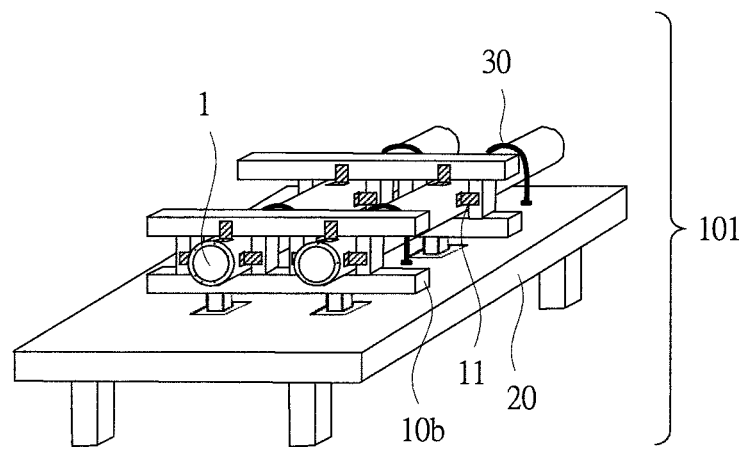
FIG. 6 is a schematic perspective view showing a pipe module to which a second embodiment of the present invention is applied.

FIG. 6 is a schematic perspective view of a pipe module 101 to which the second embodiment of the present invention is applied. FIG. 7 is an example showing the entirety of the case where temporary parts 11 are provided at three locations of upper, right and left locations of a pipe-fixing support frame 10b, and FIG. 8 is an example showing the adhesive layer 5 of the case where the temporary part 11 is adhered and fixed to the pipe-fixing support frame 10b in an enlarged manner.

In this embodiment, the support frame 10b is used instead of the base 10 of the first embodiment. Moreover, the temporary part 11 is used instead of the temporary part 2.

The support frame 10b is a structural member for fixing the pipe 1. Different from the base 10, the support frame 10b is formed so as to surround the four sides of the pipe 1.

The temporary part 11 is a member for suppressing misalignment of the pipe 1. Different from the temporary part 2, the temporary parts 11 are disposed respectively at the closest points of the pipe 1 and the support frame 10b, in other words, at a total of three locations of upper, right and left locations of the pipe.

As a result of the above-described structure, if the pipe 1 is vertically moved in the transportation of the pipe module 101, load in shear directions is generated at the upper temporary part 11 and the right and left temporary parts 11. Therefore, as shown in FIG. 4A, the shear strength in the case where the adhesive layer 5 is less than Tg tends to be somewhat reduced along with the increase in the filler size. However, high-strength adhesion can be realized by increasing the adhesion area.

Moreover, as shown in FIG. 4B, with respect to the peel-off strength in the case where the adhesive layer 5 is Tg or higher, the adhesion strength can be significantly reduced by applying heat so as to reach the glass-transition temperature of the adhesive agent or higher, applying the load in the peel-off direction to the adhesion fixing part, and increasing the filler size. In the adhesion structure at this time, the full-surface adhesion is not always required, and the partial adhesion is also possible. In any case, it is desired to carry out the adhesion so that load is easily applied in the peel-off direction on the supposition of the disassembly.

Moreover, as shown in FIG. 4C, the peel-off strength in the case where the adhesive layer 5 is less than Tg is improved along with the increase in the size of the solid filler 6. Therefore, even if the load in the peel-off direction is applied to the temporary part 11 in the transportation of the pipe module 101, the safety in the transportation can be improved.

As described above, when the pipe module 101 is composed in the above-described manner, even if stress caused by impact-like external load is generated, the high-strength adhesion of the temporary part 11 required for the transportation of the pipe module 101 and the reduction of the ratio of the disassembly strength to the adhesion strength for the easy disassembly on the site of the plant construction can be achieved. Therefore, in the construction method of the pipe module 101, the welding operation can be replaced by a simple method without consuming a lot of time for the attaching operation and the disassembling operation of the temporary part 11.

In the foregoing, the invention made by the inventors of the present invention has been concretely described based on the embodiments. However, it is needless to say that the present invention is not limited to the foregoing embodiments and various modifications and alterations can be made within the scope of the present invention.

The modularization method for efficiently transporting and installing pipes used in various power plants is an important construction method that exerts a strong influence on the construction period of plant construction. The present invention provides adhesion fixing techniques capable of replacing the welding operation by a simple method without consuming a lot of time for the attaching operation and the disassembling operation of the temporary members which require a lot of time as a result of the increase in the number of pipe modules. Thus, the plant construction period can be further shortened.

What is claimed is:

1. A pipe module comprising:
   a pipe; a temporary part for holding the pipe at a position; and a base to which the pipe and the temporary part are held,
   wherein the temporary part and the base are adhered to each other by an adhesive layer formed of an adhesive agent to which a filler is added, the adhesive agent being a two-component cold-setting epoxy adhesive agent or a two-component cold-setting acrylic adhesive agent having an elastic modulus at 25° C. is 0.1 GPa or higher, the adhesive layer being configured to have the properties that, by application of heat, the filler is thermally expanded, the adhesive layer is thermally contracted and space is generated between the adhesive layer and the temporary part or between the adhesive layer and the base by the application of heat.

2. The pipe module according to claim 1, wherein the filler has a diameter of 150 μm or more.

3. The pipe module according to claim 1, wherein the adhesive layer is configured to have the property that the application of heat causes glass transition of the adhesive agent.

4. The pipe module according to claim 2, wherein the filler has a diameter up to 3 mm.

5. The pipe module according to claim 1, wherein the filler has an elastic modulus at 25° C. higher than that of the adhesive agent by one or more orders of magnitude.

6. The pipe module according to claim 1, wherein the filler is selected from the group consisting of alumina, zirconia, mullite, silicon nitride, silicon carbide, soda glass, borosilicate glass, silica, silicon and metals containing copper, zinc or aluminum as main components.

* * * * *